(12) United States Patent
Yao et al.

(10) Patent No.: US 9,781,042 B2
(45) Date of Patent: Oct. 3, 2017

(54) NETWORK CONTROLLER SECURITY MONITOR

(71) Applicant: EMPIRE TECHNOLOGY DEVELOPMENT LLC, Wilmington, DE (US)

(72) Inventors: Guang Yao, Haidian District (CN); Shijie Xu, Haidian District (CN); Qi Li, Haidian District (CN); Xuefeng Song, Shijiazhuang (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/905,837

(22) PCT Filed: Dec. 29, 2014

(86) PCT No.: PCT/CN2014/095262
§ 371 (c)(1),
(2) Date: Jan. 18, 2016

(87) PCT Pub. No.: WO2016/106480
PCT Pub. Date: Jul. 7, 2016

(65) Prior Publication Data
US 2016/0337247 A1 Nov. 17, 2016

(51) Int. Cl.
*H04L 12/28* (2006.01)
*H04L 12/801* (2013.01)
(Continued)

(52) U.S. Cl.
CPC .......... *H04L 47/15* (2013.01); *H04L 12/6418* (2013.01); *H04L 45/58* (2013.01); *H04L 45/745* (2013.01)

(58) Field of Classification Search
CPC ... H04L 12/6418; H04L 47/15; H04L 45/745; H04L 45/58
(Continued)

(56) References Cited

U.S. PATENT DOCUMENTS 8,169,910 B1   5/2012  Kohn et al.
2012/0099591 A1   4/2012  Kotha et al.
(Continued)

OTHER PUBLICATIONS

"2014 Threats Predictions: Software Defined Networking Promises Greater Control While Increasing Security Risks," accessed at https://web.archive.org/web/20140601041940/http://blogs.mcafee.com/mcafee-labs/2014-threats-predictions-software-defined-networking-promises-greater-control-while-increasing-security-risks, Jan. 6, 2014, pp. 4.
(Continued)

*Primary Examiner* — Mang Yeung
(74) *Attorney, Agent, or Firm* — Moritt Hock & Hamroff LLP; Steven S. Rubin, Esq.

(57) ABSTRACT

Technologies are generally described for systems, devices and methods effective to compare network element instructions and network control instructions. In some examples, first instructions may be identified and may be related to flow of network traffic. The first instructions may be stored in a data structure of a memory of a network element. The network element may generate a first network instruction signature based on the first instructions. A network controller device may identify second instructions. In some examples, the second instructions may be related to control of the network traffic, and may be stored in a memory of the network controller device. The network controller device may generate a second network instruction signature based on the second instructions. The network controller device may compare the first network instruction signature to the
(Continued)

second network instruction signature to produce a comparison between the first instructions and the second instructions.

19 Claims, 6 Drawing Sheets

(51) Int. Cl.
*H04L 12/64* (2006.01)
*H04L 12/775* (2013.01)
*H04L 12/741* (2013.01)

(58) Field of Classification Search
USPC .......................................................... 370/409
See application file for complete search history.

(56) References Cited

U.S. PATENT DOCUMENTS

| | | | |
|---|---|---|---|
| 2012/0106338 A1 | 5/2012 | Pongracz et al. | |
| 2013/0060738 A1 | 3/2013 | Koponen et al. | |
| 2013/0103765 A1* | 4/2013 | Papakipos | G06Q 50/01 709/206 |
| 2013/0294331 A1* | 11/2013 | Wang | H04B 7/155 370/315 |
| 2014/0254605 A1 | 9/2014 | Anumala et al. | |

OTHER PUBLICATIONS

"OpenFlow Switch Specification," The Open Networking Foundation, Version 1.4.0, pp. 1-205 (Oct. 14, 2013).

Cole, A., "SDN: New Opportunities and Challenges for the Network Controller," accessed at https://web.archive.org/web/20140725005339/http://www.enterprisenetworkingplanet.com/datacenter/datacenter-blog/sdn-new-opportunities-and-challenges-for-the-network-controller.html, posted on Jan. 17, 2014, pp. 2.

Hinden, R.M., "Why Take Over the Hosts When You Can Take Over the Network," RSA Conference, pp. 1-41 (Feb. 24-28, 2014).

Hubbard, P., "Will SDN pose network security vulnerabilities? It depends," accessed at https://web.archive.org/web/20141211054800/http://searchsdn.techtarget.com/opinion/Will-SDN-pose-network-security-vulnerabilities-It-depends, accessed on Dec. 1, 2015, pp. 5.

Kreutz, D., et al., "Towards Secure and Dependable Software-Defined Networks," Proceedings of the second ACM SIGCOMM workshop on Hot topics in software defined networking, pp. 55-60 (2013).

Yu, D., et al., "Authentication for Resilience: the Case of SDN," Lecture Notes in Computer Science, vol. 8263, pp. 39-44 (2013).

International Search Report and Written Opinion for PCT application with application No. PCT/CN2014/095262, dated Sep. 29, 2015, 11 pages.

\* cited by examiner

NETWORK CONTROLLER SECURITY MONITOR

CROSS REFERENCE TO RELATED APPLICATION

This application is a U.S. National Stage filing under 35 U.S.C. §371 of International Application No. PCT/US14/095262 filed Dec. 29, 2014. The disclosure of the International Application is hereby incorporated herein by reference in its entirety.

BACKGROUND

Unless otherwise indicated herein, the materials described in this section are not prior art to the claims in this application and are not admitted to be prior art by inclusion in this section.

Software defined networks ("SDNs") may allow network controller devices to be separated from operation of network elements. Network elements, such as routers, programmable switches, and/or computing devices, may send and receive network traffic. Network controller devices may be programmed to control network traffic flow through network elements. In some examples, software defined networks may be able to quickly respond to changing network conditions in order to optimize network traffic flow.

SUMMARY

In some examples, network elements are generally described. The network elements may include a processor and a memory configured to be in communication with the processor. In some examples, the processor may be effective to store a flow table. In various examples, the flow table may include information related to routing of network traffic from the network element. In some fluffier examples, the processor may be also effective to calculate a network instruction signature based on the information stored in the flow table. In some other examples, the processor may be also effective to provide the network instruction signature to two or more network controller devices.

In some examples, systems are generally described. The systems may include a first, second, and third network controller device. In some other examples, the systems may also include a network element configured to be in communication with at least one of the first, second, and third network controller devices. In some examples, the first network controller device may be effective to provide a first instruction to the network element. The first instruction may be related to control of network traffic. In various examples, the network element may be effective to store the first instruction in a data structure. In some further examples, the network element may be also effective to control a flow of the network traffic from the network element based on the first instruction. In other examples, the network element may be also effective to calculate a first network instruction signature based on the first instruction stored in the data structure. In some examples, the first, second, and third network controller devices may be effective to request the first network instruction signature from the network element. In other examples, the network element may also be effective to, in response to the requests, provide the first network instruction signature to the first, second, and third network controller devices.

In some examples, methods to compare network element instructions and network control instructions are generally described. In some examples, the methods may include identifying first instructions. The first instructions may be related to flow of network traffic, and may be stored in a data structure of a memory of a network element. In some other examples, the methods may also include generating, by the network element, a first network instruction signature based on the first instructions. In various examples, the methods may also include identifying, by a network controller device, second instructions. In some examples, the second instructions may be related to control of the network traffic, and may be stored in a memory of the network controller device. In various other examples, the methods may also include generating, by the network controller device, a second network instruction signature based on the second instructions. In some further examples, the methods may include comparing, by the network controller device, the first network instruction signature to the second network instruction signature to produce a comparison between the first instructions and the second instructions.

In some examples, network controller devices are generally described. In various examples, the network controller devices may include a processor and a memory configured to be in communication with the processor. In some examples, the processor may be effective to calculate a first network instruction signature based on an application related to control of network traffic. In some other examples, the processor may also be effective to receive a second network instruction signature related to the control of the network traffic from a network element. In various other examples, the processor may also be effective to compare the first network instruction signature to the second network instruction signature to produce a comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
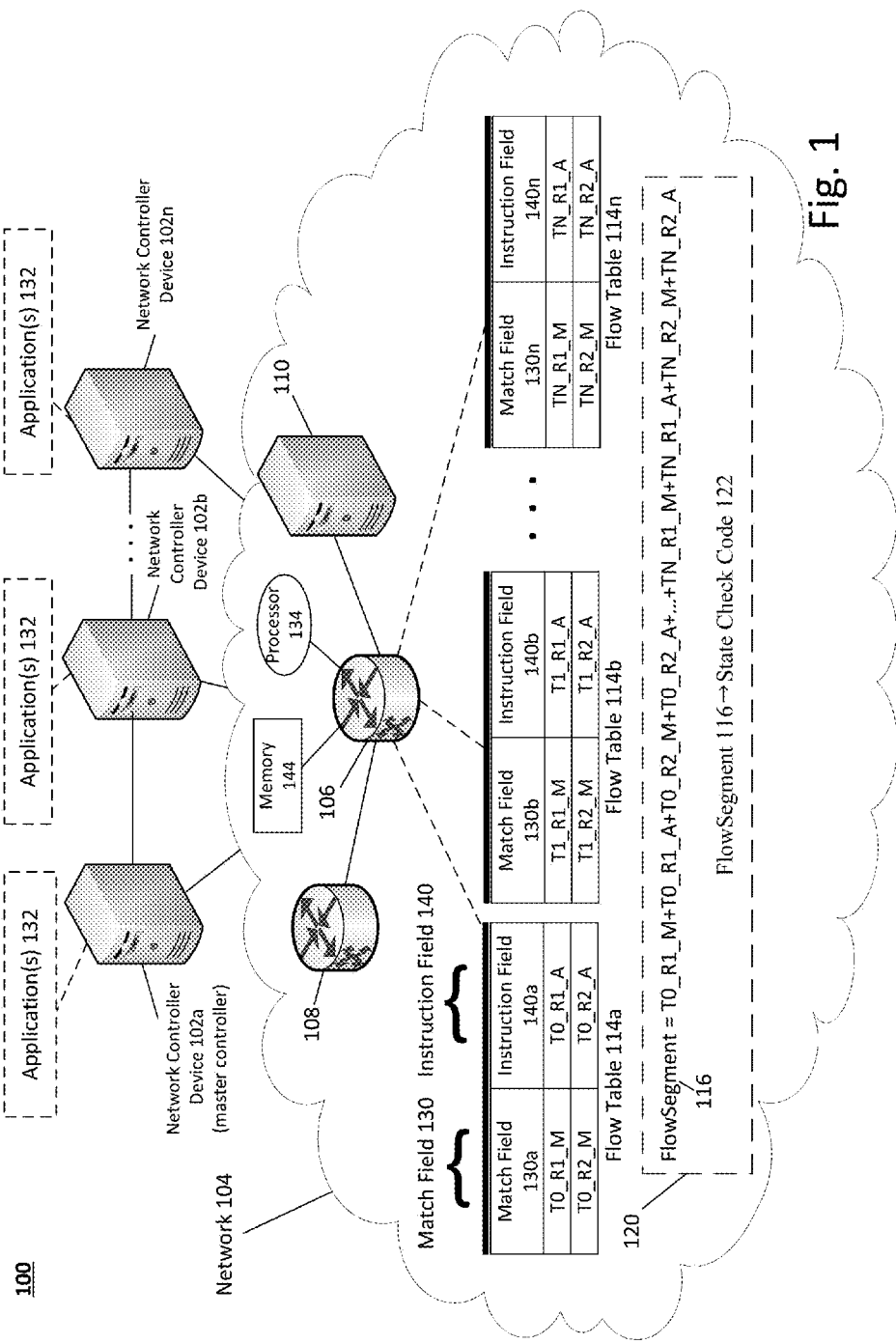
FIG. 1 illustrates an example system that can be utilized to implement a network controller security monitor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

Briefly stated, technologies are generally described for systems, devices and methods effective to compare network element instructions and network control instructions. In some examples, first instructions may be identified and may be related to flow of network traffic. In some examples, the instructions may be related to the routing of network traffic in a software defined network. The first instructions may be stored in a data structure of a memory of a network element. The network element may generate a first network instruction signature based on the first instructions. For example, the network element may concatenate character strings of the first instructions to produce the first network instruction signature. A network controller device may identify second instructions. In some examples, the second instructions may be generated by an application being executed by the network controller device. In some examples, the second instructions may be related to control of the network traffic, and may be stored in a memory of the network controller device. The network controller device may generate a second network instruction signature based on the second instructions. For example, the network controller device may concatenate character strings of the second instructions to produce the second network instruction signature. The network controller device may compare the first network instruction signature to the second network instruction signature to produce a comparison between the first instructions and the second instructions.

FIG. 1 illustrates an example system 100 that can be utilized to implement a network controller security monitor, arranged in accordance with at least some embodiments described herein. System 100 may include network controller devices 102 (including network controller devices 102a, 102b, . . . , 102n). Although three network controller devices are depicted, any number of network controller devices may be used. System 100 may further include a network 104. Network 104 may include network elements 106, 108, and/or 110, all configured to be in communication with one another. In some examples, network controller devices 102 and network 104 may be arranged in a software defined network.

Network elements 106, 108 and/or 110 may include devices such as routers, programmable switches, computing devices and/or other pieces of hardware configured to be in communication with one another and configured to receive and transmit network traffic. Network elements 106, 108 and/or 110 may include processors (such as a processor 134) and/or memories (such as a memory 144) configured to be in communication with one another. Memories of network elements 106, 108 and/or 110 may include one or more instructions effective to provide a network controller security monitor, as will be described in further detail below.

At a given time, one of network controller devices 102 may be selected or designated as a master controller. A master controller may be effective to control network elements 106, 108 and/or 110. As will be discussed in further detail below, network controller devices 102 which are not designated as a master controller may be configured to monitor operations of the master controller and of network elements 106, 108 and/or 110.

In various examples, network controller devices 102 may be computing devices and may include processors and/or memories. Network controller devices 102 may be effective to execute one or more applications 132. In some examples, applications 132 may be related to routing instructions and/or network topology and traffic flow of network 104. In some examples, each of network controller devices 102 may execute the same applications 132. Network controller devices 102 may be effective to provide network flow instructions related to routing or control of network traffic to and/or from network elements 106, 108 and/or 110. In some examples, the network flow instructions provided by network controller devices 102 may be generated based on applications 132. For example, applications 132 may generate routing instructions for packets received by network elements 106, 108, and/or 110. Network elements 106, 108 and/or 110 may be effective to control a flow of network traffic in network 104 based on the network flow instructions provided by network controller devices 102.

Network elements 106, 108 and/or 110 may include one or more flow tables 114. For example, network element 106 may include flow tables 114a, 114b, . . . , 114n. Flow tables 114 may be data structures stored by network elements 106, 108 and/or 110. In some examples, network elements 106, 108 and/or 110 may use data and/or instructions stored in flow tables 114 to make determinations related to routing of network traffic. For example, data and/or instructions stored in flow tables 114 may control packet forwarding within network elements 106, 108, and/or 110. In some further examples, data and/or instructions stored in flow tables 114 may identify packets received through a particular port of a particular network element. Data and/or instructions stored in flow tables 114 may instruct the particular network element to send identified packets out of particular ports and/or to particular network addresses. Although three flow tables 114 are depicted, any number of flow tables may be stored in a memory associated with network elements 106, 108 and/or 110. In some examples, network elements 106, 108, 110 and network controller devices 102 may be arranged in a software defined network.

Flow tables 114 may include Match Fields 130 (such s Match Fields 130a, 130b, . . . , 130n) and Instruction Fields 140 (such as Instruction Fields 140a, 140b, . . . , 140n). Match Fields 130 may include data used to identify or match information in headers of packets entering network elements 106, 108 and/or 110. An instruction stored in Instruction Field 140 may correspond to data stored in each Match Field 130. In an example, a match field may include a destination Internet Protocol (IP) address of 193.14.255.1. If a packet received by network element 106 includes the destination address 193.14.255.1 in the header of the packet, a match may occur. An instruction may be executed which corresponds to the matched IP address. For example, the instruction may indicate that the packet with the matching IF address should be sent out of a particular port of network element 106. The master controller device may provide instructions to populate the Match Fields and Instruction Fields of flow tables 114. In some examples, the master controller device may populate flow tables 114 according to instructions generated by one or more of applications 132.

Network elements 106, 108 and/or 110 may be configured to periodically calculate a Flow segment 116. Network elements 106, 108 and/or 110 may be effective to calculate flow segments 116 through concatenation of character strings represented by values stored in Match Fields 130 and Instruction Fields 140 of Flow Tables 114. As shown in dashed box 120, network element 106 may calculate Flow segment 116 by concatenating character strings in Match Fields 130 and instruction Fields 140 of Flow Tables 114. Network elements 106, 108 and/or 110 may use various hash functions (e.g., MD5, Fugue, etc.) to generate a State Check Code ("SCC") 122 based on Flow segment 116. In some examples, State Check Code 122 may be a compressed memory hash of Flow segment 116. As will be discussed below, State Check Code 122 may be used by network controller devices 102 to determine whether there are inconsistencies between data stored in flow tables 114 and data sent from a master controller device to populate flow tables 114. In some examples, such an inconsistency may indicate that the master controller device may be under attack. In various examples, flow segment 116 and/or state check code 122 may be described as a network instruction signature.

Figure 2:
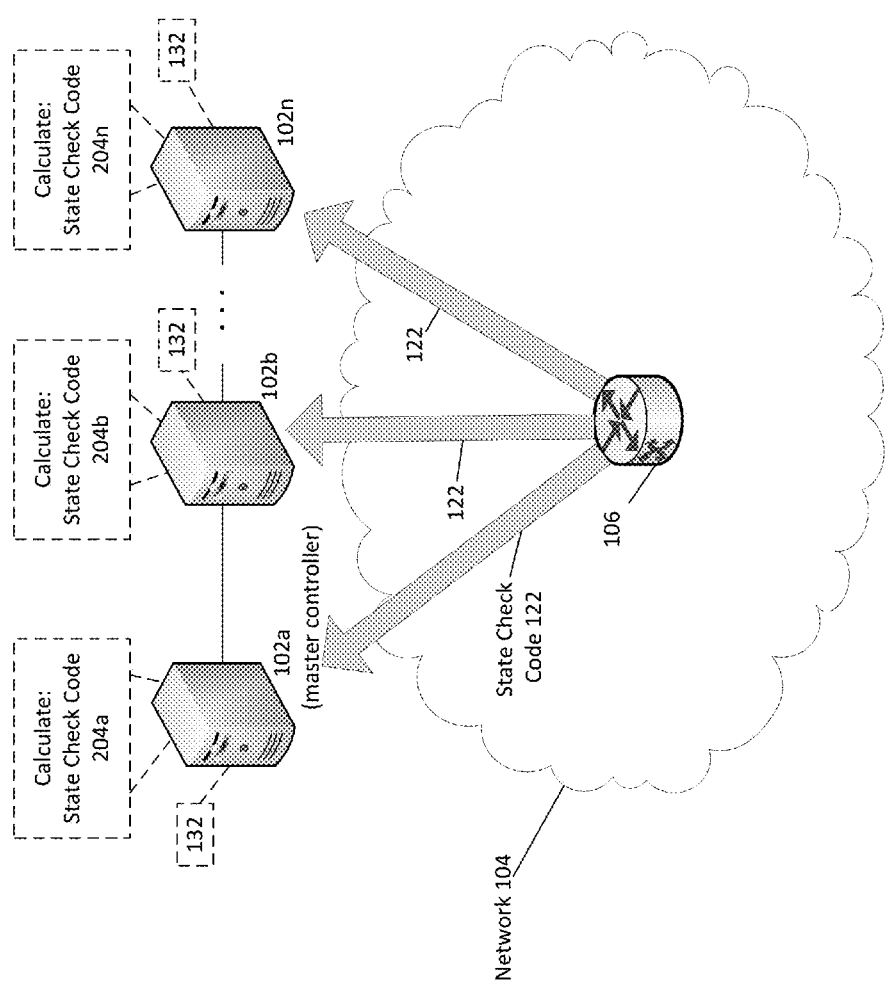
FIG. 2 depicts the example system of FIG. 1, with additional details related to a state check code.

FIG. 2 depicts example system 100 of FIG. 1, with additional details relating to state check code 122, arranged according to at least some embodiments described herein. Those components in FIG. 2 that are labeled identically to components of FIG. 1 will not be described again for the purposes of clarity and brevity.

Network controller devices 102 may periodically pull or request state check code 122 from network elements (including network element 106, depicted in FIG. 2). In response to the pull or request, network element 106 may provide the state check code 122 to network controller devices 102. Upon receipt of state check code 122, each network controller device 102 (such as network controller devices 102a, 102b, . . . , 102n) may calculate respective state check codes 204 (such as, for example, 204a, 204b, 204n). State check code 204 may be, for example, a network instruction signature calculated based on instructions generated by one or more applications 132. In some examples, instructions generated by applications 132 may be sent from a master controller device (e.g., network controller device 102a in the example depicted in FIG. 2) to populate flow tables 114 of network element 106. In some examples, state check codes 204 may be memory hashes of concatenated character strings of instructions generated by applications 132.

Figure 3:
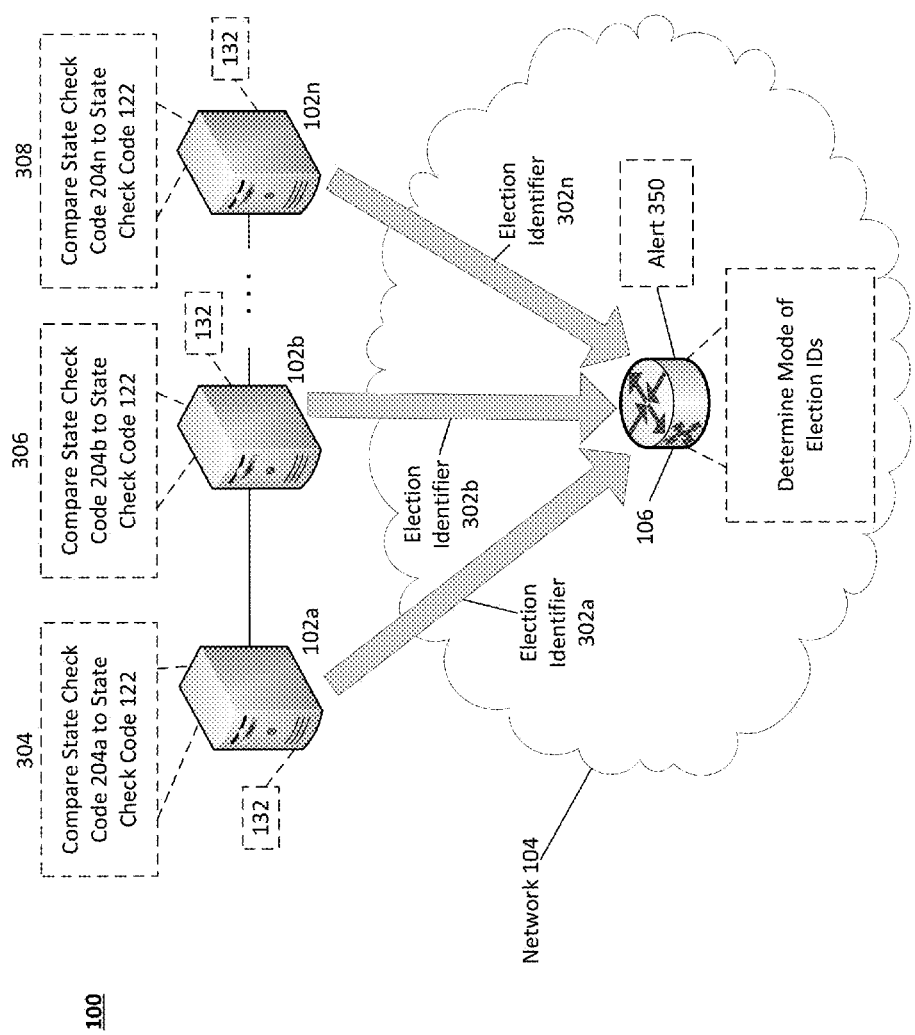
FIG. 3 depicts the example system of FIG. 1, with additional details relating to an election process for a master controller.

FIG. 3 depicts example system 100 of FIG. 1, with additional details relating to an election process for a master controller, arranged according to at least some embodiments described herein. Those components in FIG. 3 that are labeled identically to components of FIGS. 1 and 2 will not be described again for the purposes of clarity and brevity.

As depicted in dashed boxes 304, 306, and 308, each network controller device 102 may compare the state check code 204 calculated by the particular network controller device to state check code 122 received from network element 106 to produce a comparison result. For example, network controller device 102a may compare state check code 204a to state check code 122, while network controller device 102b may compare state check code 204b to state check code 122. If an inconsistency is found based on the comparisons between state check code 122 and any of state check codes 204a, 204b, . . . , 204n, an election process may be performed to determine whether or not a new master controller should be selected.

For example, when an inconsistency is determined between state check code 204 and state check code 122, each network controller device 102 may provide an election identifier 302 (including election identifier 302a, 302b, 302n) to network element 106. Network element 106 may be effective to receive election identifiers 302. For example, network controller device 102a may provide election identifier 302a to network element 106; network controller device 102b may provide election identifier 302b to network element 106, etc. Election identifiers 302 may be for example, a number of bits or a portion of the particular state check code 204 calculated by the particular network controller device 102. For example, election identifier 302a may be the last 64 bits of state check code 204a. Election identifiers 302 provided by network controller devices 102 may all include the same number of bits. In some examples, election identifiers 302 may be calculated based on applications 132.

Network element 106 may receive election identifiers 302 from network controller devices 102. Network element 106 may compare election identifiers 302 to state check code 122 or to a portion of state check code 122. Network element 106 may identify a mode from among the received election identifiers 302. A mode may be, for example, a particular value which appears most often in a set of values. In an example, six network controller devices 102a, 10b, 102c, 102d, 102e, and 102f may send six respective election identifiers 302a, 302b, 302c, 302d, 302e, and 302f to network element 106. If the values of election identifiers 302a, 302b, 302c, and 302f are all equal to one another, then that value will be the mode from among the set of six election identifiers. If the value of the particular election identifier 302 sent by the current master controller is equal to the mode, and the value of the particular election identifier 302 is equal to state check code 122, or a portion of state check code 122, the current master controller may remain as the master controller. Conversely, if the value of the particular election identifier 302 sent by the current master controller is not equal to the mode, network element 106 may select a new master controller at random from among the network controller devices 102 which sent a value for election identifier 302 equal to the mode.

For example, network controller device 102a may be the current master controller. In the example, there may be six network controller devices 102a, 102b, 102c, 102d, 102e, and 102f. After an inconsistency is determined between state check code 204a and state check code 122, each network controller device 102 may send election identifiers 302 (including, in the current example, election identifiers 302a, 302b, 302c, 302d, 3026e, and 302f) to network element 106. The set of election identifiers 302a-f may be provided to network element 106 by network controller devices 102a-f, respectively. In an example, the set of election identifiers 302a-f may include the following respective values: {1127, 1130, 1130, 1131, 1130, 1130}. In the example, the mode of the values may be 1130. As the value of election identifier 302a (provided by network controller device 102a) is not equal to the mode of the values, network element 106 may select a new master controller from among network controller devices 102b, 102c, 102e, and 102f.

In an example, each election identifier 302 sent to network element 106 by network controller devices 102 may be the same, but may not match state check code 122 or a portion of state check code 122. In the example, the current master controller may have been compromised and may have provided instructions and/or data used by network element 106 to calculate state check code 122. In response to state check code 122, or a portion thereof, not matching election identifier 302, network element 106 may select a new master controller at random from among any of network controller devices 102 other than the current master controller.

In another example, election identifiers 302 sent to network element 106 by network controller devices 102 may be the same and may match state check code 122 or a portion of state check code 122. Such a result may indicate that the election has been launched by a network controller device 102 which is not the master controller and which may have been compromised. In the example, the network element should select the current master controller as the master controller.

In another example, if network element 106 receives a particular election identifier 302 from one of network controller devices 102, but not from all network controller devices 102, network element 106 may request election identifiers 302 from all network controller devices 102. A master controller may be selected from among the network controller devices 102 which sent election identifiers 302 with values equal to the mode. In some further examples, if there is any inconsistency between election identifiers 302, network element 106 may generate an alert 350. Alert 350 may indicate the inconsistency between different election identifiers 302 and/or may list the mode of election identifiers 302. Alert 350 may be sent to controller devices 102. Controller devices 102 may store alerts 350 in memory as a record of a potential attack. Various other examples, network controller devices 102 may be effective to generate alert 350 based on the comparison of state check code 204 and state check code 122.

Among other benefits, a network controller security monitor may prevent and/or attenuate malicious attacks on network controller devices in software defined networks. A network controller security monitor may compare network control instructions provided to network elements with network control instructions generated by applications running on two or more network controller devices. If the comparison indicates an inconsistency between the network control instructions of the network elements and the network control instructions of the network controller devices, an election process may be used to identify a new master controller. Additionally, an alert may be generated and logged by a network controller device when an inconsistency is determined based on the comparison. A network controller security monitor may prevent an attack on a master network controller device from disrupting and/or controlling a software defined network.

Figure 4:
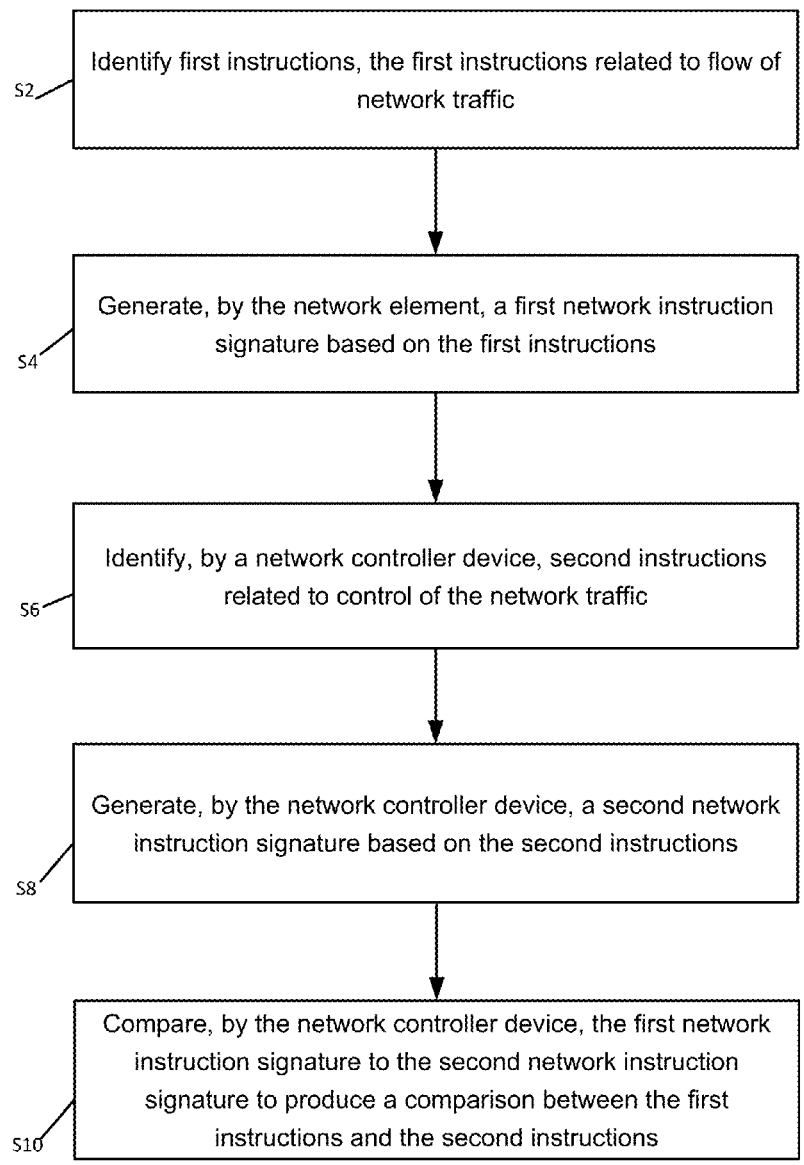
FIG. 4 depicts a flow diagram for an example process to implement a network controller security monitor.

FIG. 4 depicts a flow diagram for an example process to implement a Network controller security monitor, arranged in accordance with at least some embodiments described herein. In some examples, the process in FIG. 4 could be implemented using system 100 discussed above. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation. In some examples, the process in FIG. 4 may be used by one or more network controller devices configured in communication with one or more network elements.

Processing may begin at block S2, "Identify first instructions, the first instructions related to flow of network traffic,"

At block S2, first instructions are identified. The first instructions may be stored in a data structure of a memory of a network element. The first instructions may be stored in a data structure of a memory of the network element. In some examples, the first instructions may populate a flow table of the network element. The flow table may include strings of data stored in a match field and an instruction field. In some examples, the network element may be a router arranged in a software defined network.

Processing may continue from block S2 to block S4, "Generate, by a network element, a first network instruction signature based on the first instructions." At block S4, a network element, such as, by way of example the network element having the first instructions discussed above, may generate a first network instruction signature based on the first instructions. The network instruction signature may include concatenations of strings of data stored in a flow table of the network element. In some examples, strings of data stored in a match field and/or an instruction field of the flow table may be concatenated to produce the network instruction signature. In various examples, strings of data stored in the match field may identify packets received by the network element.

Processing may continue from block S4 to block S6, "identify, by a network controller device, second instructions related to control of the network traffic". At block S6, the network controller device may identify second instructions related to control of the network traffic. The second instructions may be stored in a memory of the network controller device. In some examples, the network controller device may be effective to generate an election identifier based on the second instructions. In some examples, the network controller device may provide the election identifier to the network element. In some examples, the second instructions may be generated based on an application executed by the network controller device.

Processing may continue from block S6 to block S8, "Generate, by the network controller device, a second network instruction signature based on the second instructions." At block S8, a second network instruction signature may be generated by the network controller device. The second network instruction signature may be generated based on the second instructions.

Processing may continue from block S8 to block S10, "Compare, by the network controller device, the first network instruction signature to the second network instruction signature to produce a comparison between the first instructions and the second instructions." At block S10, the network controller device may compare the first network instruction signature to the second network instruction signature to produce a comparison between the first instructions and the second instructions. The network controller device may generate an alert in response to the comparison. The alert may be stored in a memory associated with the network controller device. In some examples, the network controller device may generate an election identifier based on the comparison. The network element may be effective to select a master controller based at least in part on the election identifier. In some examples, the network element may be effective to select a master controller from a plurality of network controller devices based on a mode of election identifiers generated by respective network controller devices of the plurality of network controller devices. In some examples, the network element may be effective to request new identifiers be sent by the plurality of network controller devices, in response to a determination that the network element has received identifiers from less than all of the plurality of network controller devices. In some examples, a processor of the network element may be effective to select a first network controller device as a master controller based on the mode being equal to the identifier of the first network controller device.

Figure 5:
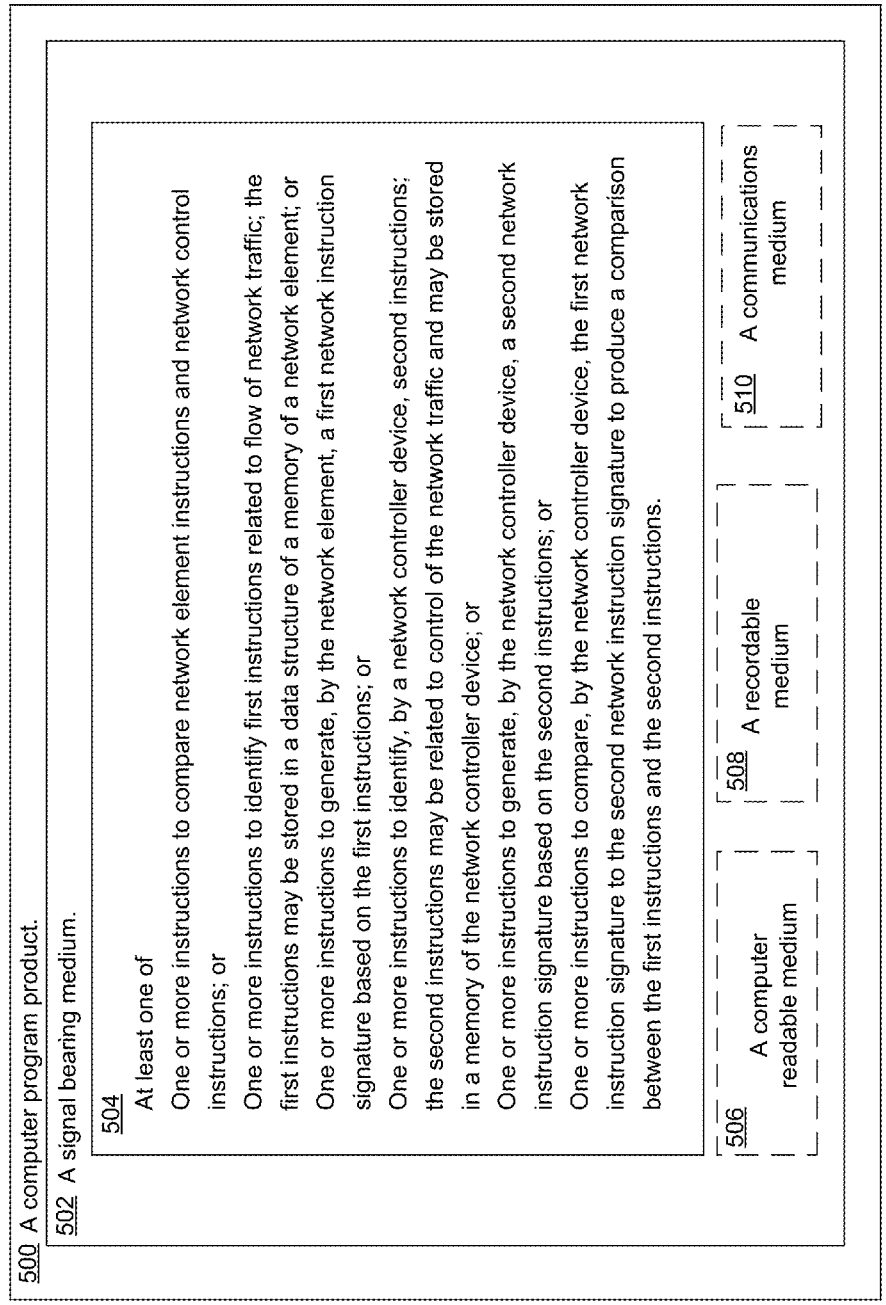
FIG. 5 illustrates an example computer program product that can be utilized to implement a network controller security monitor.

FIG. 5 illustrates an example computer program product 500 that can be utilized to implement a network controller security monitor arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, network controller device 102 and/or network element 106 may undertake one or more of the blocks shown in FIG. 5 in response to instructions 504 conveyed to the system 100 by signal bearing medium 502.

In some implementations, signal bearing medium 502 may encompass a computer-readable medium 506, such as, but not limited to, a hard disk drive (HDD), a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an radio frequency (RF) signal bearing medium 502, where the signal bearing medium 502 is conveyed by a wireless communications medium 510 (e.g., a wireless communications medium conforming with the Institute of Electrical and Electronics Engineers (IEEE) 802.11 standard).

Figure 6:
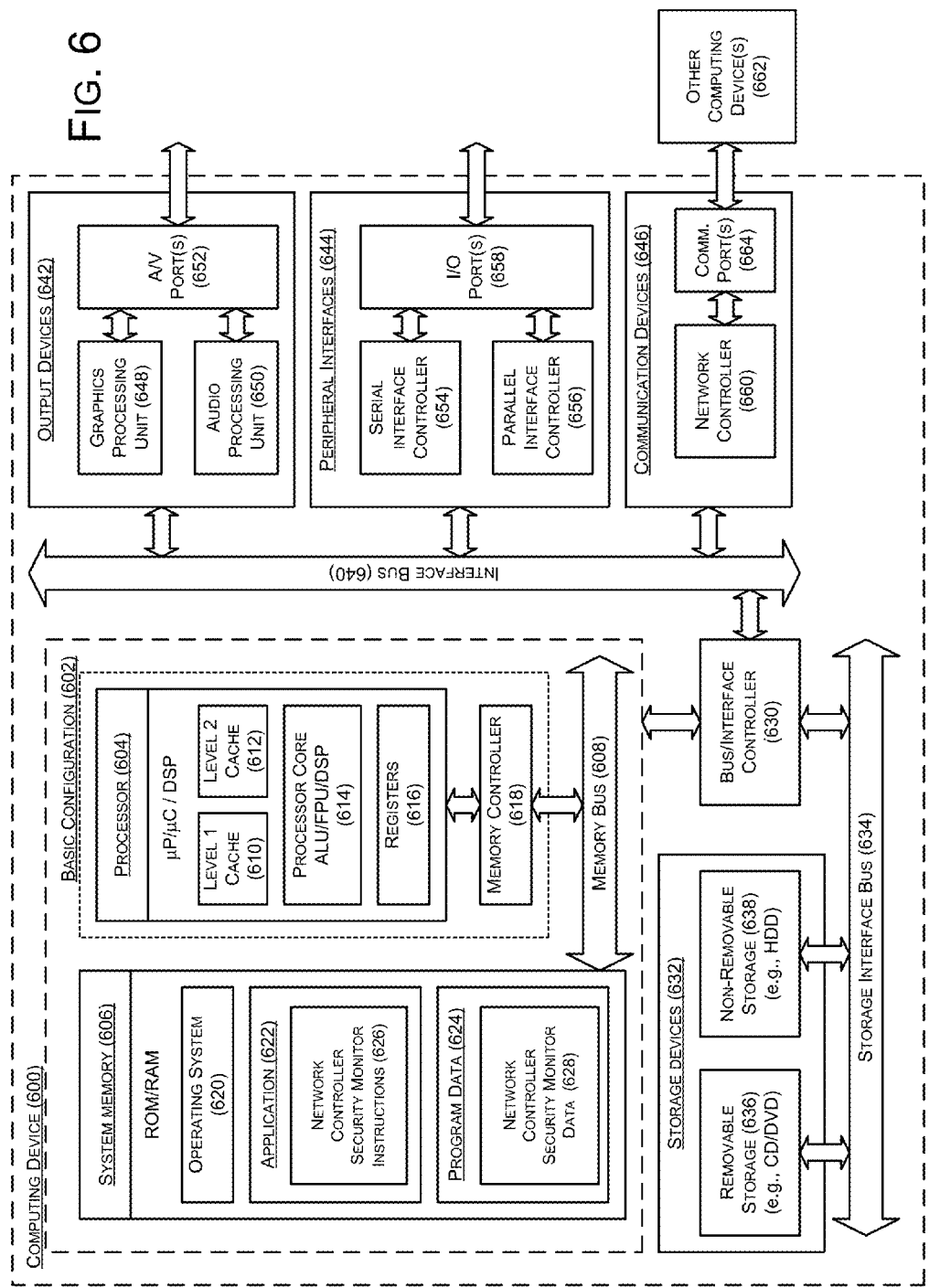
FIG. 6 is a block diagram illustrating an example computing device that is arranged to implement a network controller security monitor; all arranged according to at least some embodiments described herein.

FIG. 6 is a block diagram illustrating an example computing device 600 that is arranged to implement a network controller security monitor arranged in accordance with at least some embodiments described herein, in a very basic configuration 602, computing device 600 typically includes one or more processors 604 (such as processor 134) and a system memory 606 (such as memory 144). A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622 and program data 624. Application 622 may include network controller security monitor instructions 626 that may be arranged to perform the fictions as described herein including those described with respect to system 100 of FIGS. 1-5. Program data 624 may include network controller security monitor data 628 that may be useful to implement network control security as is described herein. In some embodiments, application 622 may be arranged to operate with program data 624 on operating system 620 such that a network controller security monitor may be provided. This described basic configuration 602 is illustrated in FIG. 6 by those components within the inner dashed line.

Computing device 600 may have additional features or functionality, and additional interfaces to facilitate communications between basic configuration 602 and any necessary devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more 10 ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases "one or more" and "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc," is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any wad all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, orange includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A network element, comprising:
a processor, wherein the processor includes hardware; and
a memory configured to be in communication with the processor, wherein the processor is configured to:
store a flow table, wherein the flow table includes information related to routing of network traffic from the network element;
calculate a network instruction signature based on the information stored in the flow table, wherein to calculate the network instruction signature, the processor is configured to concatenate strings of data stored in a match field and an instruction field of the flow table to produce the network instruction signature; and provide the network instruction signature to a first network controller device, a second network controller device, and a third network controller device, wherein a selection of a master controller is based on a first identifier, a second identifier, and a third identifier generated, based on the network instruction signature, by the first network controller device, the second network controller device, and the third network controller device, respectively.

2. The network element of claim 1, wherein the network element is a router, and wherein the network element is arranged in a software defined network.

3. The network element of claim 1, wherein the strings of data stored in the match field identify packets received by the network element.

4. The network element of claim 1, wherein the processor is further configured to:
receive the first identifier from the first network controller device, wherein the first identifier is calculated based on a first application configured to be executed on the first network controller device;
receive the second identifier from the second network controller device, wherein the second identifier is calculated based on a second application configured to be executed on the second network controller device;
receive the third identifier from the third network controller device, wherein the third identifier is calculated based on a third application configured to be executed on the third network controller device; identify a mode among the first identifier, the second identifier, and the third identifier; and
select the master controller from among the first network controller device, the second network controller device, and the third network controller device based on the identified mode.

5. The network element of claim 4, wherein the processor is configured to select the first network controller device as the master controller based on the mode being equal to the first identifier.

6. A system comprising:
a first network controller device with hardware, a second network controller device with hardware, and a third network controller device with hardware; and
a network element with hardware configured to be in communication with at least one of the first network controller device, the second network controller device, and the third network controller device, wherein:
the first network controller device is configured to:
provide a first instruction to the network element, wherein the first instruction is related to control of network traffic;
the network element is configured to:
store the first instruction in a data structure,
control a flow of the network traffic from the network element based on the first instruction, and
calculate a first network instruction signature based on the first instruction stored in the data structure;
the first network controller device, the second network controller device, and the third network controller device are configured to request the first network instruction signature from the network element;
the network element is further configured to, in response to the requests, provide the first network instruction signature to the first network controller device, the second network controller device, and the third network controller device; and the first network controller device, the second network controller device and the third network controller device are configured to generate, based on the first network instruction signature, a first identifier, a second identifier and a third identifier, respectively, wherein a master controller is selected based on the first identifier, the second identifier and the third identifier.

7. The system of claim 6, wherein:
the first network controller device is further configured to:
calculate a second network instruction signature based on first network flow instructions of the first network controller device; and
compare the second network instruction signature to the first network instruction signature to produce a first comparison;
the second network controller device is configured to:
calculate a third network instruction signature based on second network flow instructions of the second network controller device; and
compare the third network instruction signature to the first network instruction signature to produce a second comparison; and
the third network controller device is configured to:
calculate a fourth network instruction signature based on third network flow instructions of the third network controller device; and
compare the fourth network instruction signature to the first network instruction signature to produce a third comparison.

8. The system of claim 7, wherein:
the first network controller device is configured to provide the first identifier to the network element, wherein the first identifier includes at least a first portion of the second network instruction signature;
the second network controller device is configured to provide the second identifier to the network element, wherein the second identifier includes at least a second portion of the third network instruction signature; and
the third network controller device is configured to provide the third identifier to the network element, Wherein the third identifier includes at least a third portion of the fourth network instruction signature.

9. The system of claim 8, wherein the network element is further configured to, responsive to a determination that the network element receives less than all of the first identifier, the second identifer, and the third identifier, request that new identifiers be sent by each of the first network controller device, the second network controller device and the third network controller device.

10. The system of claim 8, wherein the network element is further configured to:
identify a mode among the first identifier, the second identifier, and the third identifier; and select the master controller from among the first network controller device, the second network controller device, and the third network controller device based on the identified mode.

11. The system of claim 10, wherein the network element is configured to select the second network controller device as the master controller based on the mode being equal to the second identifier.

12. The system of claim 6, wherein the first network controller device, the second network controller device, and the third network controller device are configured to execute an application, and
wherein the first instruction is based on the application.

13. The system of claim 6, wherein:
the network element is a router;
the network element is arranged in a software defined network; and
the first network controller device is a master controller.

14. The system of claim 6, wherein to calculate the first network instruction signature, the network element is configured to concatenate strings of data stored in a match field and an instruction field of the data structure to produce the first network instruction signature.

15. A method to compare network element instructions and network control instructions, the method comprising:
identifying first instructions, wherein the first instructions are related to flow of network traffic, and wherein the first instructions are stored in a data structure of a memory of a network element;
generating, by the network element, a first network instruction signature based on the first instructions;
identifying, by a network controller device, second instructions, wherein the second instructions are related to control of the network traffic, and wherein the second instructions are stored in a memory of the network controller device;
generating, by the network controller device, a second network instruction signature based on the second instructions;
comparing, by the network controller device, the first network instruction signature to the second network instruction signature to produce a comparison between the first instructions and the second instructions;
based on the comparison, generating, by the network controller device, an election identifier based on the second network instruction signature;
selecting, by the network element, a master controller based at least, in part, on the election identifier; and
providing, by the master controller, instructions to populate a flow table of the network element, wherein the flow table includes strings of data stored in a match field and an instruction field.

16. The method of claim 15, further comprising:
providing, by the network element, third network instruction signatures to the master controller, wherein the third network instruction signatures comprise concatenations of the strings of data stored in the flow table.

17. The method of claim 15, further comprising:
generating an alert, by the network controller device, in response to the comparison; and
storing the alert in the memory associated with the network controller device.

18. A network controller device, comprising:
a processor, wherein the processor includes hardware; and
a memory configured to be in communication with the processor, wherein
the processor is configured to:
calculate a first network instruction signature based on an application related to control of network traffic;
receive a second network instruction signature related to the control of the network traffic from a network element, wherein the second network instruction signature is generated based on a concatenation of strings of data stored in a match field and an instruction field of a flow table, and wherein the flow table includes information related to routing of the network traffic from the network element;
compare the first network instruction signature to the second network instruction signature to produce a comparison; and
generate an election identifier based on the comparison, wherein the election identifier is used to select a master controller.

19. The network controller device of claim 18, wherein the processor is further configured to provide the election identifier to the network element.

* * * * *

UNITED STATES PATENT AND TRADEMARK OFFICE
CERTIFICATE OF CORRECTION

PATENT NO. : 9,781,042 B2
APPLICATION NO. : 14/905837
DATED : October 3, 2017
INVENTOR(S) : Yao et al.

It is certified that error appears in the above-identified patent and that said Letters Patent is hereby corrected as shown below:

In Column 1, Line 37, delete "fluffier examples," and insert -- further examples, --, therefor.

In Column 4, Line 51, delete "(such s" and insert -- (such as --, therefor.

In Column 4, Line 64, delete "matching IF" and insert -- matching IP --, therefor.

In Column 6, Line 29, delete "10$b$," and insert -- 102$b$, --, therefor.

In Column 6, Line 53, delete "3026$e$," and insert -- 302$e$, --, therefor.

In Column 7, Line 31, delete "Various other" and insert -- In various other --, therefor.

In Column 7, Line 53, delete "Network controller" and insert -- network controller --, therefor.

In Column 9, Line 41, delete "herein, in" and insert -- herein. In --, therefor.

In Column 9, Line 67, delete "the fictions" and insert -- the functions --, therefor.

In Column 10, Line 55, delete "more 10 ports" and insert -- more I/O ports --, therefor.

In Column 11, Line 58, delete ""a" or an" and insert -- "a" or "an" --, therefor.

In Column 11, Line 62, delete "and "at least"" and insert -- or "at least" --, therefor.

In Column 12, Line 29, delete "wad all" and insert -- and all --, therefor.

In Column 12, Line 42, delete "orange includes" and insert -- a range includes --, therefor.

In Column 14, Line 42, in Claim 8, delete "Wherein the" and insert -- wherein the --, therefor.

Signed and Sealed this
Fifteenth Day of May, 2018

Andrei Iancu
*Director of the United States Patent and Trademark Office*

In Column 14, Line 47, in Claim 9, delete "second identifer," and insert -- second identifier, --, therefor.